June 13, 1961 G. W. CROWELL 2,987,888
HYDRAULIC MASTER DRIVE UNIT
Filed Nov. 23, 1959 2 Sheets-Sheet 1
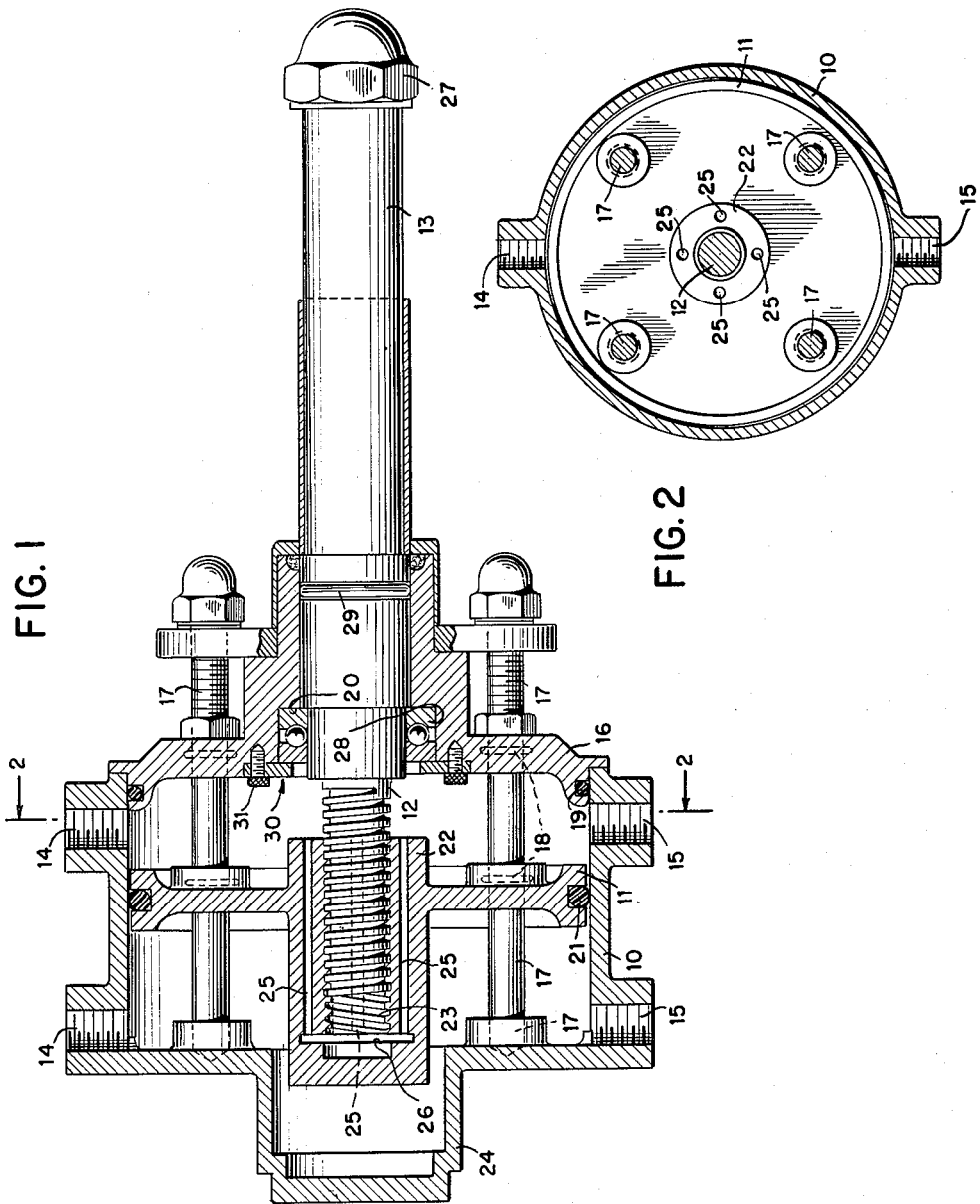
INVENTOR.
Gordon W. Crowell
BY
Adams, Forward & McLean
ATTORNEYS

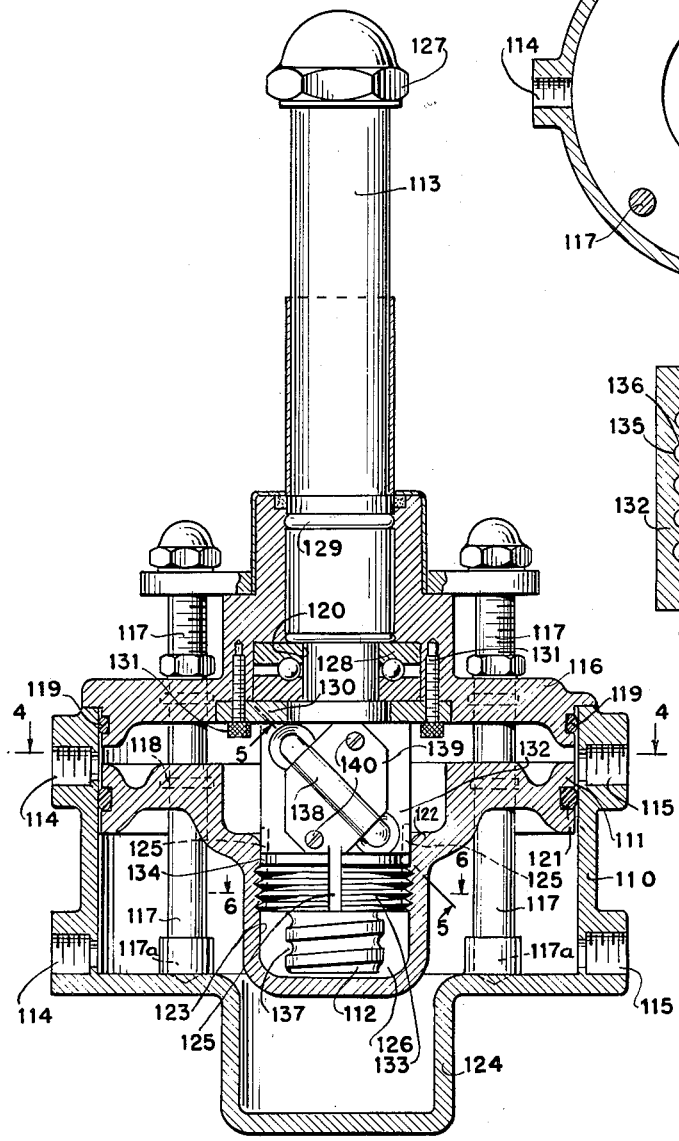

United States Patent Office 2,987,888
Patented June 13, 1961

2,987,888
HYDRAULIC MASTER DRIVE UNIT
Gordon W. Crowell, West Point Pleasant, N.J., assignor to Crowell Designs, Inc., West Point Pleasant, N.J., a corporation of New Jersey
Filed Nov. 23, 1959, Ser. No. 854,865
15 Claims. (Cl. 60—54.6)

This application is a continuation-in-part of my pending application Serial No. 550,531, filed December 2, 1955, now abandoned.

My invention relates to hydraulic systems for controlling motions remotely and, in particular, to a hydraulic drive unit for such systems.

The controlling of motions remotely can be done by electrical or mechanical means. In some installations, however, electrical means are not practical or not permitted. Also, in some installations mechanical linkages are impracticable, cumbersome or too costly. For example, linkages to move remotely camera booms or fire fighting turrets often are cumbersome and hazardous. Also, for example, steering gears for boats often are cumbersome. In particular, steering gears in small boats up to about 75 feet in length have always been difficult to install because of the number of components. This is especially true in the newer boats which frequently use more than one steering station, e.g. one inside the main cabin and the other outside on the so-called "flying-bridge." In addition to multiple steering stations, a number of the more modern yachts also are installing automatic pilots which further complicates the steering gear installation. Most designs for mechanical steering gears which operate with a minimum of friction and lost motion and are also irreversible in their action so that the helm will remain fixed regardless of the pressure against the rudder or rudders, require a complex assortment of rods, levers, gears, racks, cables, sheaves and worms. The components of such steering gear units may restrict living quarters and also may be hazardous, if left exposed.

I have devised a hydraulic master drive unit which because of its advantageous construction permits the use of a simplified hydraulic system for remote control comprising a master drive unit directly coupled through a two pipe system to a driven unit which actuates a part, the motion of which is desired, for example, a rudder, a camera boom or a fire fighting turret.

The master drive unit of my invention comprises a hollow cylinder, a double acting piston within the cylinder which slidably engages the inner wall of the cylinder and which piston has a hub containing a recess containing internal threads for receiving a threaded revolvable piston rod and outlet means in the cylinder on each side of the piston. The recess in the piston hub is a blind recess and means are provided for the escape of fluid from the recess. The threaded revolvable piston rod can engage the internally threaded recess directly, or indirectly by means of a ball screw arrangement. In the ball screw arrangement, the recess contains means mounted in fixed relation to the recess and defining an internally threaded bore receiving the threaded piston rod in which the threaded rod revolves on balls. The piston rod is extended to serve as a control shaft which is turned to provide movement of the piston rod or is attached to a separate control shaft in a suitable manner. For example, the movement of a wheel attached to the shaft causes rotation of the piston rod. The revolving rod engages the recess containing the internal threads and imparts a corresponding linear movement to the piston which displaces hydraulic fluid in the cylinder through the pipe system to one side of the piston of the driven unit which actuates the part to be moved. The driven unit comprises a hollow cylinder containing a double acting piston having a piston rod. The driven unit is attached to the part to be moved, e.g. a rudder post, by conventional means to provide movement of the part, e.g. the rudder, in accordance with the movement of the driven unit piston.

My system is completely balanced, i.e. the volumetric displacement of the entire system remains constant throughout its range or stroke. Thus complications inherent to check and pressure relief valves, pressure accumulators and the like are avoided. Moreover, the drive unit provides accurate and fast control of the part to be moved. When the direct engagement thread arrangement is utilized, irreversibility of the control shaft is obtained. For example, when used in a steering gear system for boats no amount of back pressure generated by rudder resistance will move the helm shaft. This irreversible arrangement is particularly advantageous in steering heavy-duty boats, e.g. fishing boats, where it is desirable to be able to set a course and leave the wheel for other duties. When the ball screw arrangement is utilized, reversibility and fast and effortless motion are obtained which are particularly desirable in steering light, fast, mobile boats. Moreover, a minimum of components is required in my system thereby providing simplicity of installation and maintenance. My device is not limited to use in steering gears for boats or for moving camera booms or fire fighting equipment but is useful generally wherever it is desired to move something by remote control.

The master drive unit of my invention will be further illustrated by reference to the accompanying drawings of particularly advantageous units designed particularly as a drive unit for a hydraulic steering gear system for boats.

FIGURE 1 is a longitudinal cross-sectional view of a unit utilizing the direct engagement thread arrangement.

FIGURE 2 is a sectional view of the unit taken along plane 2—2 of FIGURE 1.

FIGURE 3 is a longitudinal cross-sectional view of a unit utilizing the ball screw arrangement.

FIGURE 4 is a cross-sectional view taken along 4—4 of FIGURE 3.

FIGURE 5 is a cross-sectional view taken along 5—5 of FIGURE 3.

FIGURE 6 is a cross-sectional view taken along 6—6 of FIGURE 3.

In FIGURES 1 and 2, the master drive unit comprises a hollow cylinder or chamber 10, a double acting piston 11 slidably engaging the inner wall of the cylinder 10 and a threaded revolving piston rod 12 forming part of the helm shaft 13.

The cylinder 10 is provided with filling means 14 and outlet means 15 for hydraulic fluid on each side of the piston 11. The outlet means 15 are connected by lines, e.g. copper tubing, to the corresponding sides of the slave unit piston. The cylinder 10 has a cylinder head 16 which is held to the cylinder body by four holding rods 17 which pass through the cylinder head 16 and piston 11 and are removably secured by threaded means 17a to the opposite end of the cylinder. The four holding rods 17 also provide means for preventing the piston 11 from revolving due to the torque resulting from the action of the revolving threaded piston rod 12. The holding rods 17 have means for sealing their passage through the piston and cylinder head, e.g. a tubular rubber O ring 18. Sealing means are provided for the cylinder head and cylinder, e.g. a tubular rubber O ring 19. The cylinder head also contains an opening 20 for the piston rod 12 and helm shaft 13. The cylinder assembly 10 is constructed so that an equal volume of fluid is displaced when the piston 11 is moved in either direction from the midpoint of its travel. Thus, the cylinder 10 is divided into compartments of equal volume by the piston 11 at the midpoint of its travel.

The piston 11 is a double acting disc piston which slidably engages the inner wall of the cylinder 10 through a sealing means, e.g. a tubular rubber O ring 21. The piston 11 includes a hub portion 22 which contains a blind recess 23. The recess 23 is threaded internally to receive the threaded piston rod 12. The revolving of the threaded piston rod 12 engages the female threads and causes linear movement of the piston 11. The cylinder 10 is shaped to compensate for the displacement of the hub 22 by providing a compensating portion 24. No compensation for the displacement of the piston rod need be provided since it consists only of a threaded member that revolves and does not move in or out.

The recess 23 in the piston hub into which the piston rod thread fits is blind and thus no provision for sealing oil leakage between the piston rod threads and the recess thread need be made. However, since the relative movement between the piston rod thread and the piston 11 admits of a pocket ahead of the threaded piston rod member in which oil might become trapped due to the close fit between the thread of the rod 12 and the piston 11, means are provided communicating from the recess into the cylinder to allow escape and entry of any fluid, i.e. oil and/or air, entrapped. This is advantageously accomplished by drilling a plurality of passages 25 in the piston hub 22 parallel to the thread and joining the passages together by an annular groove 26 machined at the deepest extremity of the recess thread. Alternatively, the passages can be drilled in the piston rod 12 to provide communication between the annular groove 26 and the cylinder portion behind the piston hub 22. A plurality of holes permits the escape of entrained air more readily than a single hole, so that when the system is initially filled with oil, the task of bleeding off the air is more easily accomplished. In the particular illustrated design, four holes 25 are drilled so that the piston 11 and cylinder 10 can be assembled in any possible position and the entire assembly can also be installed in any possible position.

The piston rod 12 is threaded with power-transmitting threads, e.g. American Standard Acme threads or Translating threads, on one end to engage directly the recess threads of the piston hub. The other end is attached to control or helm shaft 13 which holds the helm wheel held to the shaft by a nut 27. The Acme thread of this particular piston rod is ¾ inch in diameter, 6 threads per inch. A thrust bearing 28 and O ring seal 29 are provided also. Retaining ring 30 supports the thrust bearing 28 and screws 31 hold the retaining ring in place.

An important characteristic of the unit of FIGURES 1 and 2 is that the pitch of the piston rod thread is sufficiently low to provide adequate mechanical advantage to move a comparatively large piston against considerable hydraulic pressure and at the same time due to its low helix angle the unit becomes irreversible in its action. By this, I mean that no amount of back pressure will cause the control shaft to revolve even when unattended. For example, back pressure generated by rudder resistance will not cause movement of the helm shaft. The pitch can vary from about ⅛ of an inch to about ¼ of an inch per revolution and the helix angle from about 3.5 to 5.5 degrees. A preferred pitch is ⅙ of an inch and a preferred helix angle is 4°33′. Multiple thread screws do not appear to give a low enough helix angle to insure that the shaft will be irreversible. It appears that when the screw follows closely the American Standard Acme thread design the best compromise between the ideal square thread and standard form thread is obtained. It is usually impractical to use the square thread due to the great difficulty in cutting it accurately, particularly the female thread in the piston.

Another benefit derived from this function is that where more than one control station, e.g. a steering station, is required, control from either or any station is positive without blocking any alternate master cylinder by valving. For example, when a boat is piloted from the helm in the cabin, the helm on the flying bridge will not move, and when control is desired to be taken over at the flying bridge station it can be done instantly and movement of the helm at the second station will not be reflected by a corresponding movement of the helm at the first station. This is because the helm shaft-piston rod threads have such low helix angles as to be irreversible in action which, in turn, premits the two helms to be piped to the slave unit in parallel. This parallel hook-up is accomplished by T's in the hydraulic lines, one branch of which leads to one control station and the other branch to the other control station.

In FIGURES 3 to 6, the unit is provided with a ball screw arrangement. In FIGURES 3 to 6, the unit is similar to that of FIGURES 1 and 2. Thus the unit of FIGURES 3 to 6 comprises a cylinder 110, piston 111, piston rod 112, helm shaft 113, filling means 114, outlet means 15, cylinder head 116, holding rods 117 and securing means 17a, rod O rings 118 and cylinder O ring 119, helm shaft opening 120, piston O ring 121, hub 122, blind recess 123, hub compensating portion 124, blind recess drain passages 125, annular space 126, helm shaft nut 127, thrust bearing 128, thrust bearing O ring 129, thrust bearing retaining ring 130 and holding screws 131, in a structure similar to that of FIGURES 1 and 2. The unit of FIGURES 3 to 6 operates in the same general manner as the unit of FIGURES 1 and 2. The cylinder assembly 110 is constructed, as in FIGURES 1 and 2, so that an equal volume of fluid is displaced when the piston 111 is moved in either direction from the midpoint of its travel and the cylinder 110 is divided into compartments of equal volume by the piston 111 at the midpoint of its travel. Also, as in the unit of FIGURES 1 and 2, the cylinder 110 is shaped to compensate for the displacement of the hub 122 by providing a compensating portion 124 and no compensation for the displacement of the piston rod need be provided since it consists only of a threaded member that revolves and does not move in and out. Also, as in the unit of FIGURES 1 and 2, a blind recess 123 is provided to eliminate need for sealing oil leakage and means are provided communicating from the recess into the cylinder to allow escape of fluid entrapped in the annular space 126 of the recess, e.g. a plurality of passages 125 grooved into threaded portion 133 and nut 132, to be described more fully below. The fluid flows through grooves 125 in the threaded portion 133 into the annular ring 134 and from there through the grooves 125 in nut 132 into the cylinder portion behind the hub 122. Alternatively, the piston hub 122 can be drilled to provide communication between the space 126 and the cylinder portion behind hub 122.

The unit of FIGURES 3 to 6 differs primarily from that of FIGURES 1 and 2 in that the piston hub portion 122 and blind recess 123 contain means mounted in fixed relation thereto and defining an internally threaded bore for receiving the threaded piston rod in which bore the threaded piston rod revolves on ball bearings in a ball screw arrangement. Ball screws are known devices. The illustrated means comprises a nut 132 with an integral threaded portion 133 for engaging the internally threaded recess in fixed relation thereto. The nut 132 is square in shape and provided with thread grooves 135 for receiving ball bearings 136. The piston rod 112 is provided with thread grooves 137 for the ball bearings 136. The nut 132 is provided with guide 138 for the balls 136 and clamp 139, for retaining guide 138, attached to the nut 132 with screws 140. The guide 138 returns the balls to the nut 132 to complete the circuit. In operation, when the piston rod 112 is rotated it rotates inside the ball nut 132 and since the nut is in fixed relation to the recess of the piston hub, the piston is moved linearly. Stop means can be provided to prevent the piston rod 112 from being withdrawn too far into the nut 132, i.e. to prevent withdrawal to a point where the balls 136 would escape from the nut 132.

My system utilizing the irreversible unit of FIGURES 1 and 2 is particularly advantageous for use with automatic pilots in steering gear for boats. The usual method of installing automatic pilots for steering gears is to link the automatic pilot directly to a steering gear by means of a chain and sprocket so that when the boat is steered manually it is necessary to overcome a certain amount of friction due the automatic pilot linkage. Also, when on automatic pilot the helm wheel revolves sharply and with considerable force thus constituting a hazard to any one falling against it. In the system of my invention utilizing the unit of FIGURES 1 and 2 neither the manual helm or automatic helm will revolve when the boat is on automatic pilot. Also, when the boat is being steered manually no interference is encountered due to the presence of the pilot unit. In the system the automatic pilot mechanism can advantageously be directly coupled to another helm master drive unit separate from any steering station and in parallel with them. Thus, in effect another steering station is provided whose location can be in a place of greatest convenience without adding friction to the operation of a manually operated steering station.

My system utilizing the reversible unit of FIGURES 3 to 6 can be used also in dual or plural control stations by connecting the control station drive units in series to actuate a driven unit and when either station is used both drive units revolve synchronously. In certain applications such as in steering light, fast, mobile boats this feature of reversibility and fast effortless actuation is highly desirable.

The driven cylinder is constructed, for example, of a hollow cylinder or chamber at each end of which is a cylinder head with four holding rods. There is a gland at each end of the cylinder through which the piston rod passes. The piston is fastened at approximately the middle of the piston rod so that the piston rod not only transmits the thrust of the piston to the part to be moved, e.g. a rudder arm, but also steadies the piston, especially at the extremities of its stroke. Since the piston rod extends at all times through both ends of the cylinder, the displacement of the piston rod itself need not be considered. The full advantages of such a structure can be utilized only when in combination with the unique design of the master drive unit.

Conventional means are used to connect the driven unit to the part to be moved, e.g. a rudder, a camera boom or fire fighting turret. For example, in connecting the driven unit to a rudder the rudder arm is connected at right angles to one end of the piston rod. Horizontal and vertical articulation is provided between the clevis end of the piston rod and the rudder arm. For example, a clevis is provided in a vertical plane at the end of the piston rod and connected to a clevis in a horizontal plane attached to the rudder arm. Provision is made to allow unrestricted pivoting of the driven unit in both the vertical and horizontal planes to compensate for the articulate movement of the rudder arm and also possible misalignment of the axes of the rudder stock and the pivot of the mounting bracket of the driven unit. For example, the driven unit is mounted on the end opposite the rudder actuating end in a pair of trunnions, one in the horizontal plane and one in a vertical plane. Flexible hydraulic connections to each end of the unit are provided, for example, reinforced rubber hose, because of the articulate movement of the unit. The main hydraulic lines connecting the master drive unit with the driven unit can be of any suitable material, for example copper tubing. Also, they can be of a flexible material such as reinforced rubber if desired.

As described above the system I have devised is completely balanced, i.e. the volumetric displacement of the entire system remains constant throughout its range of stroke, thus avoiding complications inherent to check and pressure relief valves, pressure accumulators, and the like. This is accomplished by providing the driven unit with a double piston rod so that the displacement of the piston rod itself does not have to be compensated for. Also no compensation for the displacement of the master control shaft piston rod need be provided since it consists only of a threaded member that revolves within the recess and does not move either in or out. Such variation of volumetric displacement that may result from fluctuations of temperatures and divergence of coefficients of expansion between the units, the piping, and the hydraulic fluid, is compensated for by the use of flexible rubber reinforced hoses at the driven unit.

I claim:

1. A hydraulic unit which comprises a hollow cylinder, a piston within the cylinder slidably engaging the inner wall of the cylinder and displacing an equal volume of fluid when moved in either direction from the midpoint of travel, the piston including a hub containing a blind recess containing internal threads for receiving a threaded revolvable piston rod so that revolving of the piston rod causes linear movement of the piston, means communicating from the blind end of the recess to the opposite end of the hub and into the cylinder for escape of the fluid from the recess, and outlet means in the cylinder on each side of the piston.

2. The unit of claim 1 in which the piston hub recess is internally threaded and the threads of the piston rod directly engage the internally threaded piston hub recess and are of a pitch sufficiently low to provide adequate mechanical advantage and of a helix angle sufficiently low to provide irreversibility of the unit under back pressure.

3. The unit of claim 2 in which the threads of the piston rod are power-transmitting threads of a pitch between about ⅛ of an inch to about ¼ of an inch per revolution and having a helix angle of between about 3.5 to 5.5 degrees.

4. The unit of claim 3 in which the threads are of a pitch of about ⅙ of an inch and the helix angle is about 4°33′.

5. The unit of claim 1 in which the piston hub recess includes means mounted in fixed relation to the recess and defining an internally threaded bore receiving the threaded piston rod in which the threaded piston rod revolves on balls in a ball screw arrangement.

6. A hydraulic unit which comprises a hollow cylinder, a piston within the cylinder slidably engaging the inner wall of the cylinder and displacing an equal volume of fluid when moved in either direction from the midpoint of travel, identical rod means for holding a removable head to the cylinder and for preventing rotation of the piston, the piston including a hub containing a blind recess containing internal threads for receiving a threaded revolvable piston rod so that revolving of the piston rod causes linear movement of the piston, means communicating from the blind end of the recess to the opposite end of the hub and into the cylinder for escape of the fluid from the recess, and outlet means in the cylinder on each side of the piston.

7. The unit of claim 6 in which the piston hub recess is internally threaded and the threads of the piston rod directly engage the internally threaded piston hub recess and are of a pitch sufficiently low to provide adequate mechanical advantage and of a helix angle sufficiently low to provide irreversibility of the unit under back pressure.

8. The unit of claim 7 in which the threads of the piston rod are power-transmitting threads of a pitch between about ⅛ of an inch to about ¼ of an inch per revolution and having a helix angle of between about 3.5 to 5.5 degrees.

9. The unit of claim 8 in which the threads are of a pitch of about ⅛ of an inch and the helix angle is about 4°33′.

10. The unit of claim 6 in which the piston hub recess includes means mounted in fixed relation to the recess and defining an internally threaded bore receiving the threaded piston rod in which the threaded piston rod revolves on balls in a ball screw arrangement.

11. A hydraulic unit which comprises a hollow cylinder, said cylinder having a removable head secured to the body of the cylinder by a plurality of holding rods passing through the head and an internal piston and removably secured to the end of the cylinder opposite the head, the internal piston slidably engaging the inner wall of the cylinder and displacing an equal volume of fluid when moved in either direction from the midpoint of travel, the piston including a hub containing a blind recess containing internal threads for receiving a threaded revolvable piston rod so that revolving of the piston rod causes linear movement of the piston, said recess having an annular space at the blind end and at least one passage communicating from said annular space to the opposite end of the hub and into the cylinder and outlet means in the cylinder on each side of the piston.

12. The unit of claim 11 in which the piston hub is internally threaded and the threads of the piston rod directly engage the internally threaded piston hub recess and are of a pitch sufficiently low to provide adequate mechanical advantage and of a helix angle sufficiently low to provide irreversibility of the unit under back pressure.

13. The unit of claim 12 in which the threads of the piston rod are power-transmitting threads of a pitch between about ⅛ of an inch to about ¼ of an inch per revolution and having a helix angle of between about 3.5 to 5.5 degrees.

14. The unit of claim 13 in which the threads are of a pitch of about ⅛ of an inch and the helix angle is about 4°33′.

15. The unit of claim 11 in which the piston hub recess includes means mounted in fixed relation to the recess and defining an internally threaded bore receiving the threaded piston rod in which the threaded piston rod revolves on balls in a ball screw arrangement.

References Cited in the file of this patent

UNITED STATES PATENTS

| | | |
|---|---|---|
| 1,894,055 | Perkins | Jan. 10, 1933 |
| 2,204,649 | Barnhart | June 18, 1940 |
| 2,267,524 | Hawkins | Dec. 23, 1941 |
| 2,287,960 | Ballard | June 30, 1942 |
| 2,374,672 | Farris | May 1, 1945 |
| 2,471,619 | Hardy | May 31, 1949 |
| 2,688,260 | Muller | Sept. 7, 1954 |

FOREIGN PATENTS

| | | |
|---|---|---|
| 829,314 | France | Mar. 28, 1938 |
| 612,012 | Germany | Apr. 11, 1935 |